(12) United States Patent
Booth

(10) Patent No.: US 7,984,187 B2
(45) Date of Patent: Jul. 19, 2011

(54) SYSTEM AND METHOD FOR CONSTRUCTING TRANSACTIONS FROM ELECTRONIC CONTENT

(75) Inventor: Stephen C. Booth, Fort Collins, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1777 days.

(21) Appl. No.: 10/932,782

(22) Filed: Sep. 2, 2004

(65) Prior Publication Data

US 2006/0053082 A1   Mar. 9, 2006

(51) Int. Cl.
*G06F 15/16*   (2006.01)
(52) U.S. Cl. ............... 709/246; 709/236; 709/245
(58) Field of Classification Search .......... 709/200, 709/203, 236, 245, 246
See application file for complete search history.

(56) References Cited

U.S. PATENT DOCUMENTS

| 6,006,242 | A | * | 12/1999 | Poole et al. | 715/209 |
|---|---|---|---|---|---|
| 6,785,707 | B2 | * | 8/2004 | Teeple | 709/203 |
| 7,669,133 | B2 | * | 2/2010 | Chikirivao et al. | 715/744 |
| 2001/0049620 | A1 | * | 12/2001 | Blasko | 705/10 |
| 2002/0049812 | A1 | * | 4/2002 | Nahon | 709/204 |
| 2003/0084098 | A1 | * | 5/2003 | Lavin et al. | 709/203 |
| 2004/0003033 | A1 | | 1/2004 | Kamen et al. | |
| 2004/0049579 | A1 | * | 3/2004 | Ims et al. | 709/225 |
| 2004/0133635 | A1 | * | 7/2004 | Spriestersbach et al. | 709/203 |
| 2006/0265689 | A1 | * | 11/2006 | Kuznetsov et al. | 717/117 |
| 2007/0106629 | A1 | * | 5/2007 | Endacott et al. | 706/47 |
| 2007/0156670 | A1 | * | 7/2007 | Lim | 707/4 |

* cited by examiner

*Primary Examiner* — Faruk Hamza
(74) *Attorney, Agent, or Firm* — Matthew A. Pequignot; Pequignot + Myers LLC

(57) ABSTRACT

A system and method for constructing transactions by requesting content from content providers, such as web sites, according to automatically generated content references. From that content and according to user-defined rules, the system can generate other content references, and request and access further content. Statistics can be maintained for each content access. The system and method can be used to test electronic networks, such as wireless communications networks.

8 Claims, 4 Drawing Sheets

SYSTEM AND METHOD FOR CONSTRUCTING TRANSACTIONS FROM ELECTRONIC CONTENT

BACKGROUND OF THE INVENTION

This invention relates generally to transaction construction from electronic content.

There are products that use embedded web browser technology and a sophisticated graphical interface to record and playback traditional web-based transactions. Among other limitations of such systems, some do not support Wireless Application Protocol (WAP), and furthermore, others may record transactions but do not construct them. What is needed is preferably, but not limited to, a system and method for defining and executing transactions, in particular a system and method that do not require sophisticated embedded browser technology nor a graphical browser interface. Such a system and method could provide for construction of transactions and could provide for automatic execution of the operations that are part of the transactions. The system and method could be used, for example, for automatically testing communications links such as those that are part of a wireless network.

SUMMARY OF THE INVENTION

The problems set forth above as well as further and other problems are resolved by the present invention. The solutions and advantages of the present invention are achieved by the illustrative embodiments and methods described herein below.

The system and method of the present invention provide a mechanism for automatically defining and executing arbitrary operations that form transactions that involve content referencing, for example, across a wireless communications link. Operations can be automatically repeated as well. Furthermore, the system and method of the present invention allow changes to the rules governing content reference selection.

Transactions that are constructed by the present invention can be executed in any environment that provides access to content, including environments that access network-provided content through a gateway, such as, for example, General Packet Radio Service (GPRS), Circuit-switched Data (CSD), Local Area Network (LAN), and Wide Area Network (WAN).

For a better understanding of the present invention, reference is made to the accompanying drawings and detailed description. The scope of the present invention is pointed out in the appended claims.

DETAILED DESCRIPTION OF THE INVENTION

Figure 1:
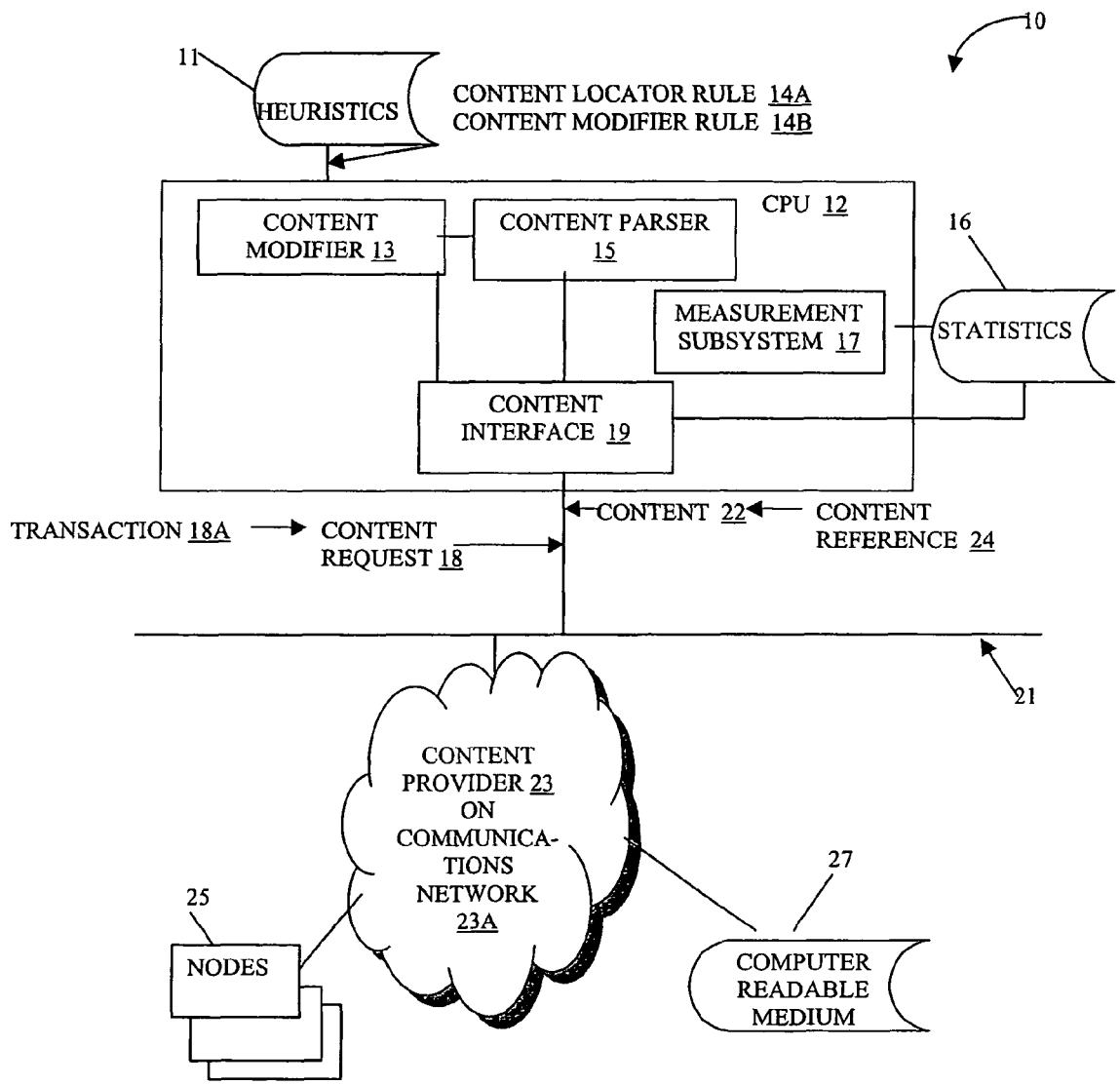
FIG. 1 is a schematic block diagram of the environment in which the system and method of the present invention can execute.

The present invention is now described more fully hereinafter with reference to the accompanying views of the drawing, in which the illustrative embodiments of the present invention are shown.

The following description presents an illustrative embodiment of the present invention that utilizes WAP technology in which the following definitions apply. WAP, a set of protocols analogous to industry standards HyperText Transport Protocol (HTTP) and Transport Control Protocol (TCP), is designed for wireless devices such as cell phones that have limited bandwidth, memory, screen size, etc. Wireless Markup Language (WML), a markup language conceptually similar to industry standard HyperText Markup Language (HTML), is designed for wireless devices such as cell phones that have limited bandwidth, memory, screen size, etc. Hypertext reference (href) is a well-known standard syntax for referencing documents on the internet.

Referring now to FIG. 1, system 10 of the illustrative embodiment of the present invention includes, but is not limited to, at least one content modifier 13, at least one content parser 15, and at least one content interface 19, which together automatically execute at least one transaction 18A. In the illustrative embodiment, electronic interface 21 connects system CPU 12 with at least one content provider 23 accessible, for example, from a communications network such as the internet. The at least one content provider 23 can access electronic content from any source to which it is in electronic communication such as, for example, at least one computer node 25 and at least one computer readable medium 27. System 10 determines which content 22 to retrieve by accessing heuristics 11, which can contain information such as, for example, at least one content locator rule 14A and, optionally, at least one content modifier rule 14B.

Continuing to refer to FIG. 1, system 10 executes at least one content request 18 through at least one content interface 19 and retrieves content 22. All of the at least one content requests 18 form at least one transaction 18A. At least one content parser 15 parses content 22 for an embedded at least one content reference 24 according to at least one content locator rule 14A. At least one content modifier 13 may modify the embedded at least one content reference 24 according to at least one content modifier rule 14B, and at least one content interface 19 retrieves further content 22 based on the modified at least one content reference 24, restarting the operation cycle of at least one transaction 18A. Optionally at least one measurement subsystem 17 can track at least one statistic 16 relevant to transaction 18A such as, for example, the amount of time it takes to retrieve content 22.

Figure 2A:
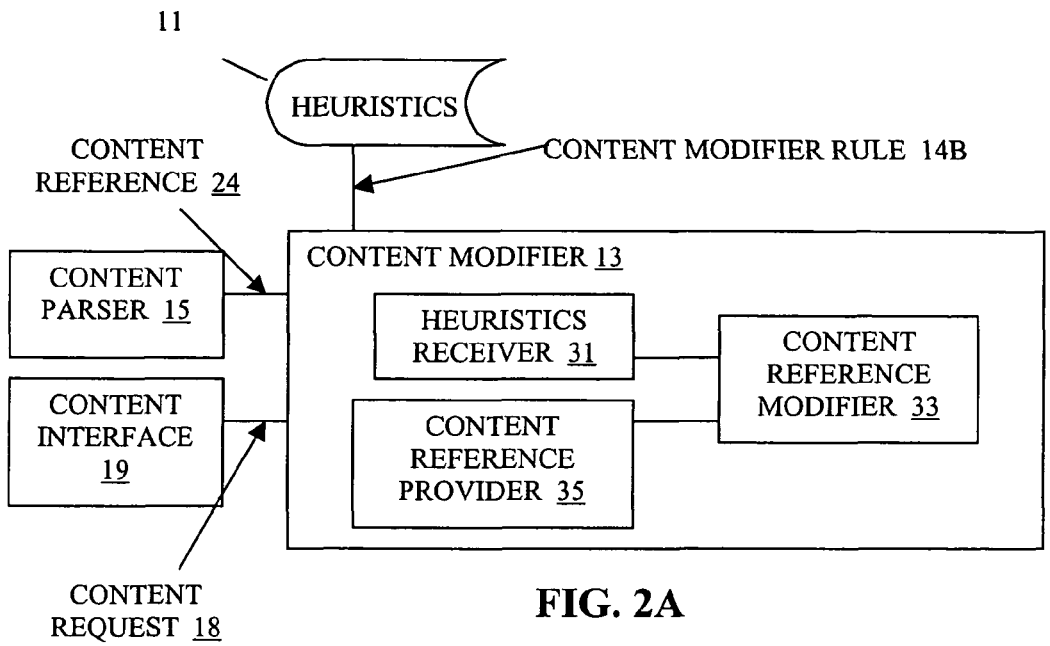
FIG. 2A is a schematic block diagram of the components of the content modifier of the illustrative embodiment of the present invention.

Referring now to FIGS. 2A-2D, the major components of the illustrative embodiment of system 10 are described. Referring first to FIG. 2A, at least one content modifier 13 can include, but is not limited to, at least one heuristics receiver 31, at least one content reference modifier 33, and at least one content reference provider 35. At least one heuristics receiver 31 accesses at least one content modifier rule 14B in order to determine how at least one content reference 24 is to be modified for the next operation of at least one transaction 18A. At least one content modifier rule 14B can be, for example, stored on at least one computer readable medium 27

(FIG. 1) or entered manually. At least one content reference modifier 33 may modify at least one content reference 24 according to at least one content modifier rule 14B. Content reference provider 35 prepares at least one content request 18 from at least one content reference 24 and provides at least one content request 18 to at least one content interface 19.

Figure 2B:
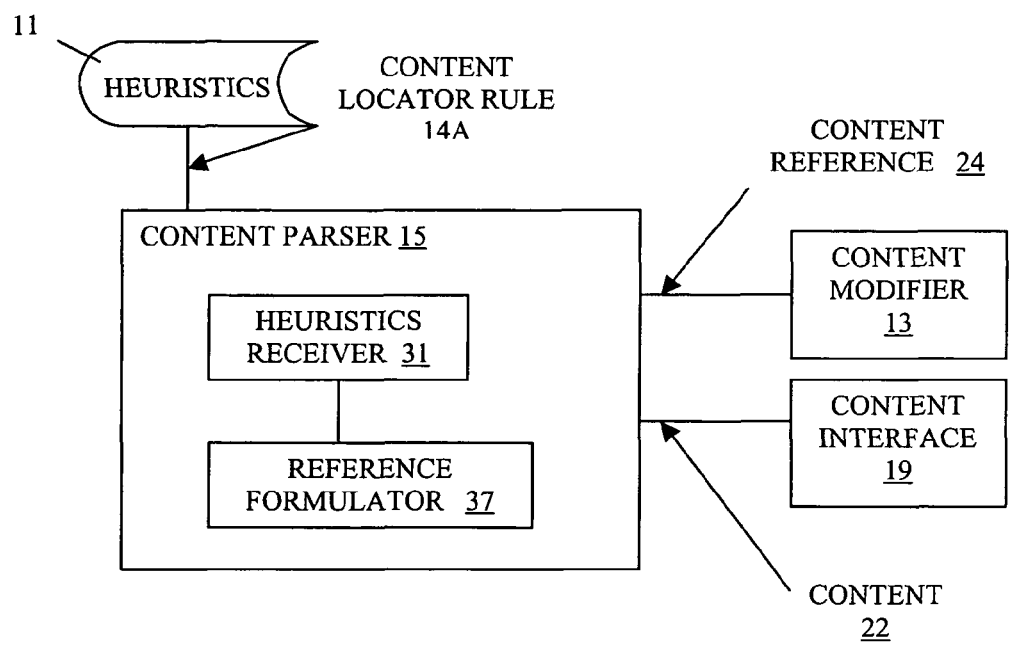
FIG. 2B is a schematic block diagram of the components of content parser of the illustrative embodiment of the present invention.

Referring now to FIG. 2B, at least one content parser 15 can include, but is not limited to, at least one heuristics receiver 31 and at least one reference formulator 37. At least one heuristics receiver 31 can access at least one content locator rule 14A from, for example, a store of heuristics 11. At least one reference formulator 37 can parse content 22 provided by at least one content interface 19 to find at least one reference 24 within content 22 using at least one content locator rule 14A to establish how the parsing is to proceed. At least one content reference 24 can be provided to at least one content modifier 13.

Figure 2C:
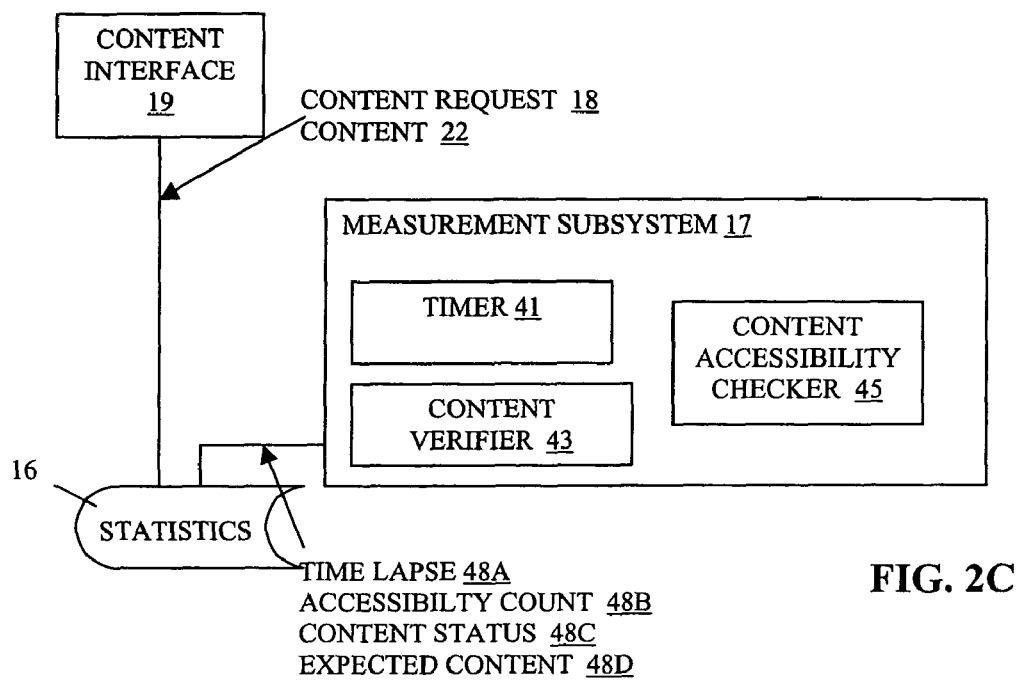
FIG. 2C is a schematic block diagram of the components of the measurement subsystem of the illustrative embodiment of the present invention.
Figure 2D:
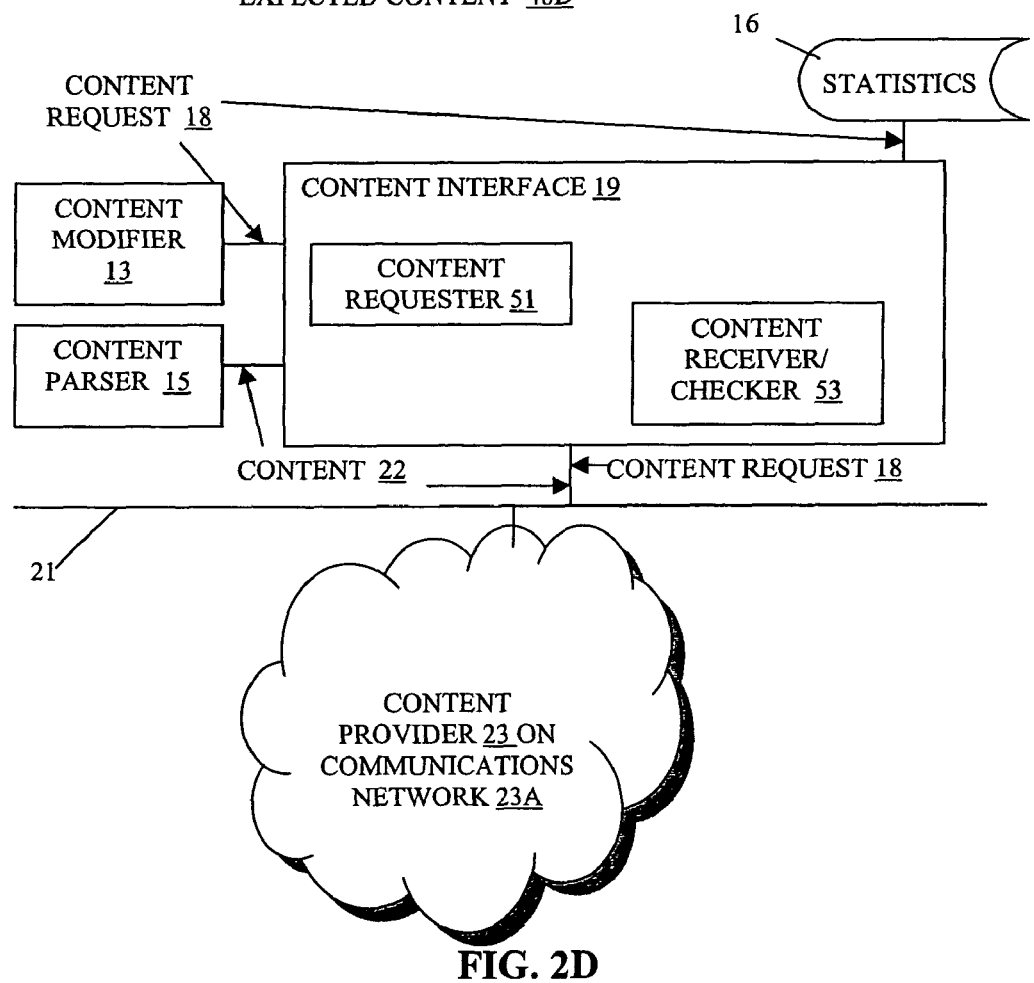
FIG. 2D is a schematic block diagram of the components of the content interface of the illustrative embodiment of the present invention.

Referring now to FIG. 2C, at least one measurement subsystem can include, but is not limited to, at least one timer 41, at least one content accessibility checker 45, and at least one content verifier 43. At least one timer 41 evaluates time lapse 48A which could be retrieved from at least one statistic 16. Time lapse 48A can represent an operation completion time, which could be the time between when at least one content request 18 was received by at least one content interface 19, and when content 22 was received by at least one content interface 19. At least one content accessibility checker 45 can continuously determine accessibility count 48B, which is a measure of how often content 22 can actually be accessed after at least one content request 18 is executed by at least one content interface 19. At least one content verifier 43 can continuously determine content status 48C, which is a measure of the integrity of content 22. At least one content verifier 43 can, for example, compare content 22 to expected content 48D. Referring now to FIG. 2D, at least one content interface 19 can include, but is not limited to at least one content requester 51 and at least one content receiver/checker 53. At least one content requester 51 can request content 22 from at least one content provider 23 through electronic interface 21 according to at least one content request 18 received from at least one content modifier 13. At least one content receiver/checker 53 can receive content 22 from at least one content provider 23 through electronic interface 21 and provide content 22 to at least one content parser 15. At least one content interface 19 can provide status information to at least one statistic 16 that can be used for later processing by at least one measurement subsystem 17. At least one content requester 51 is capable of providing at least one statistic 16 about the at least one content request 18, and at least one content receiver/checker 53 is capable of continuously ascertaining at least one statistic 16 related to the content 22.

An example of an implementation of system 10 follows. Interaction between heuristics 11, at least one content parser 15, and at least one content modifier 13 could be enabled through a combined use of a content selection syntax, a data set of modification parameters and values, and an example transaction having a sequence of at least two operations that select, modify, and execute at least one content reference 24, referred to in this section as href. At least one content provider 23 can be part of, for example, a WAP environment. The example transaction can follow a chain of hrefs, can allow modifications to each href in the chain, can allow hrefs to be named and stored for future use, and can substitute href values for their names. An operation can include, for example, (1) the downloading of content 22 such as, for example, a web page, from at least one content provider 23 on a computer network, for example, the internet, (2) the application of a set of heuristics to select an href from the downloaded content 22, (3) the application of a set of content modifiers to the selected href, (4) the possible storage of the modified href for later use, and (5) the measurement of component steps of the operation. The heuristics of href selection and modification may be governed by special href selection syntax. The href selection syntax may be used by each operation, and the transaction can automatically substitute the value of any variable referenced within the href syntax.

Operationally, the example transaction typically starts with a declared href rather than one that is previously stored, to which an empty set of heuristics and modifiers have been applied. As each operation of the example transaction is executed, it produces a new href for possible use by a future operation in the same example transaction. The new href can be stored under an arbitrary name in a data store accessible to all operations in the example transaction. In the illustrative embodiment, the example transaction need not be recorded, but instead can be constructed by specifying, manually or otherwise, the operations comprising the example transaction. Each time the example transaction is executed, the operations of the example transaction are executed in sequence. Components of each operation are measured to provide meaningful data to customers. Measurements include, but are not limited to, href accessibility, time to download the href, and whether the downloaded content is valid.

As an example, an href-selection syntax could appear as follows: NAME:name [card={<number>|"text"} count=<num> ontimer $(var)=value]search text The elements of the href selection syntax could include, but would not be limited to, the following:

(a) NAME:name. This entry can associate name with a selected href for the duration of the transaction.

(b) href-selection modifiers, enclosed in brackets [ ]. The modifiers could be optional, but brackets can be required when modifiers are used.

(1) The card=modifier can limit href selection to a specific card within a WML deck. The choices can be indicated by braces { } and |:

(i) card=<number> can select a card by number; for instance, card=2 can limit the search for an href to the second card in the deck.

(ii) card="text" can limit the search for an href to the card in the deck whose identification or title string exactly matches text.

(2) The count=modifier can indicate a specific address or anchor element within a card (or within the deck, if no card is specified). count=1 can indicate the first such element, count=2 can indicate the second, etc.

(3) The ontimer modifier can require a card=modifier and no search text. It can select the href associated with a card's ontimer attribute (or the card's onevent type="ontimer" element).

(4) $(var)=value. This modifier, which can be optional, may not be used to select an href, but can be applied to the selected href. It can perform a case-sensitive string match, and can substitute value for the first occurrence of the string $(var) found in the selected href. Multiple instances of this modifier can be allowed.

(c) search text. This is text that can be directly associated with a WML <a> or <anchor> element. For example, it might be text found between an <a> and its corresponding </a> in the WML content. search text can be case-sensitive, and can be made to match a substring of the directly-associated text.

An example WML deck could appear as follows:

```
<wml>
    <card id= "splash" title= "timer" ontimer= "#main">
        <timer value= "1"/>
    </card>
    <card id= "main" title= "myWapSite">
        <p><a href= "http://wap.myWapSite.org"> My WAP site </a></p>
    </card>
    <card id= "business" title= "blind">
        <p><a href= "http://wap.hooray.org"> My hooray </a></p>
        <p><a href= "http://wap.lastHooray.com/wml"> Last hooray
</a></p>
        <p>Your horoscope for today:
        <a href = "http://wap.horoscope.com/index.wml"> click here
</a></p>
        </card>
    <card id= "horo" title= "scope">
        <p>Pisces
        <a href= "http://wap.horoscope.com/pisces.wml"> click here
</a></p>
        <p>Libra
        </card>
        <a href="http://wap.horoscope.com/libra.wml">click here</a></p>
        </card>
    <card id="weather">
        <p>Zip Code:
        <input type="text" name="zp" value="" format="5N"/>
        <a title="OK" href="http://wap.weather.org/
gett?zz=$(zp)">Submit</a>
        </p>
    </card>
</wml>
```

[card="blind"]hooray—This expression limits the href selection to the card whose ID or title is blind. Within that card, the element whose directly-associated text contains hooray is located. In this example, there are two such entries; the first one is chosen by default, and the selected href is http://wap.hooray.com.

[card="blind"]LAST hooray—This expression limits the href selection to the card whose ID or title is blind. Within that card, the element whose directly-associated text contains LAST hooray is located. The search is case-sensitive, and fails to find a matching entry.

[card="business" count=2]hooray—This expression limits the href selection to the card whose ID or title is business. Within that card, the element whose directly-associated text contains hooray is located. There are two such entries; count=2 chooses the second entry, and the selected href is http://wap.lastHoorah.com/wml.

[count=3]click here—This expression finds the third element in the WML deck whose directly-associated text contains click here. http://wap.horoscope.com/libra.wml is selected.

[card='scope']Pisces—This expression limits the href selection to the card whose ID or title is scope, the fourth card. However, the expression fails because there is no element whose directly-associated text contains Pisces. The string Pisces is present in the card, but is independent of an <a> or <anchor> element.

[card=1 ontimer]—This expression selects #main, the href associated with the ontimer element of the first card. #main is a deck-relative href indicating the second card in the current deck. The current deck is already present, so should not be reloaded. Notice that there is no search text when the ontimer modifier is used.

site—This expression has no modifiers, so selects the first href in the deck whose directly-associated text contains site. http://wap.myWapSite.org is selected.

[card='weather' $zp=12345 $(zp)=80528]Submit—This expression limits the href selection to the card whose ID or title is weather. Within that card, the element whose directly-associated text contains Submit is located. The selected href is http://wap.weather.org/gett?zz=$(zp), but there are post-selection modifiers to apply to it. The literal string $zp does not exist in the href, so that modifier is ignored. The literal string $(zp) exists in the href, so its value is substituted. The final selected href is http://wap.weather.org/gett?zz=80528.

This next and final example illustrates use of the NAME feature of the href selection syntax.

```
wap operation #1
    href = http://wap.startingURL.com
    href_select = NAME:nextUrl [card= 'business'] click here
wap operation #2
    href = $(nextUrl)
```

In this example, WAP operation #1 downloads WML content, extracts an href from that content, and makes that href available to WAP operation #2. WAP operation #1 may specify an href and may also specify an href_select property with a NAME component. If WAP operation #1 downloads the WML deck described above, href_select can select the href, http://wap.horoscope.com/index.wml, and may assign it the name nextUrl. This assignment can last for the duration of the example transaction. WAP operation #2 also specifies an href by referencing the named href using the syntax $(<name>), for example $(nextUrl). The example transaction may then automatically substitute the value, http://wap.horoscope.com/index.wml, before executing the operation.

Figure 3:
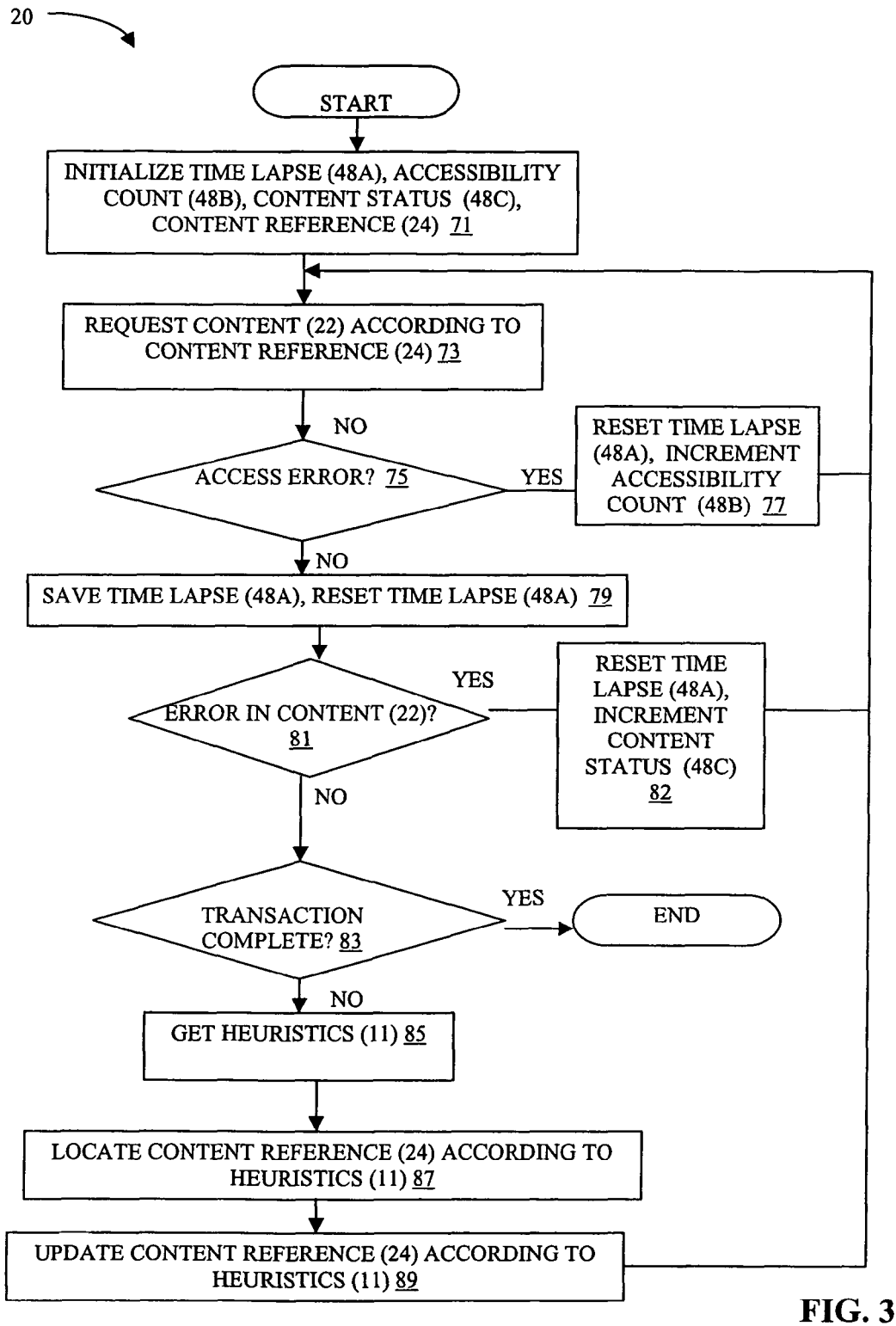
FIG. 3 is a flowchart of the method of the illustrative embodiment of the present invention.

Referring now to FIG. 3, method 20 of the illustrative embodiment of the present invention includes, but is not limited to, the steps of initializing time lapse 48A, accessibility count 48B, content status 48C, and at least one content reference 24 (method step 71), and requesting content 22 according to at least one content reference 24 (method step 73). If at least one content interface 19 (FIG. 2D) is able to access content 22 (decision step 75), method 20 includes the steps of recording the time required for the access, time lapse 48A, and resetting the value of time lapse 48A (method step 79). If content interface 19 (FIG. 2D) is not able to access content 22 (decision step 75), method 20 includes the steps of resetting time lapse 48A, incrementing accessibility count 48B (method step 77), and requesting more content 22 (method step 73). If there is an error in content 22 (decision step 81), method 20 includes the steps of resetting time lapse 48A, incrementing content status 48C (method step 82), and requesting more content 22 (method step 73). If there is no error in content 22 (decision step 81), and the at least one transaction 18A is complete (decision step 83), method 20 is complete. If there is no error in content 22 (decision step 81), and the at least one transaction 18A is not complete (decision step 83), method 20 includes the steps of getting heuristics 11 (method step 85), locating at least one content reference 24 according to heuristics 11 (method step 87), updating at least one content reference 24 according to heuristics 11 (method step 89), and requesting more content 22 (method step 73).

Method 20 can be, in whole or in part, implemented electronically. Signals representing actions taken by elements of system 10 can travel over electronic communications media. Control and data information can be electronically executed and stored on computer-readable media, such as computer readable medium 27. The system can be implemented to execute on at least one node 25 in communications network 23A. Common forms of computer-readable media include, for example, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, a carrier wave, or any other medium from which a computer can read.

Although the invention has been described with respect to various embodiments and methods, it should be realized that this invention is also capable of a wide variety of further and other embodiments and methods within the spirit and scope of the appended claims.

What is claimed is:

1. A system for constructing at least one transaction comprising:
   a central processing unit;
   at least one content interface for connecting the central processing unit to at least one content provider by sending a first content request to said at least one content provider and by receiving content through an electronic interface from said at least one content provider, said first content request forming at least one transaction;
   heuristics stored on a computer readable medium for specifying at least one content locator rule and at least one content modifier rule;
   at least one content parser for locating at least one content reference from said received content based on said at least one content locator rule; and
   at least one content modifier for preparing a second content request from said at least one located content reference according to said at least one content modifier rule;
   wherein said at least one content interface is for providing said second content request to said at least one content provider.

2. The system as defined in claim 1, wherein said at least one content modifier comprises:
   at least one heuristics receiver for accessing said at least one content modifier rule;
   at least one content reference modifier for modifying said at least one content reference according to said at least one content modifier rule; and
   at least one content reference provider for formulating said second content request from said at least one content reference.

3. The system as defined in claim 1, wherein said at least one content parser comprises:
   at least one heuristics receiver for accessing said at least one content locator rule; and
   at least one reference formulator for parsing said content to determine at least one content reference according to said at least one content locator rule.

4. The system as defined in claim 1, wherein said at least one content interface comprises:
   at least one content requester for requesting said content from said electronic interface according to said the first and the second content requests; and
   at least one content receiver/checker for receiving said content from said electronic interface and for providing said content to said at least one content parser.

5. The system as defined in claim 4,
   wherein said at least one content requester is for providing at least one statistic about least one of said first or second content requests, and
   wherein said at least one content receiver/checker is for continuously ascertaining at least one statistic related to said content.

6. A system for constructing at least one transaction comprising:
   a central processing unit;
   at least one content interface for connecting the central processing unit to at least one content provider by sending a first content request to said at least one content provider and by receiving content through an electronic interface from said at least one content provider, said first content request forming at least one transaction;
   heuristics stored on a computer readable medium for specifying at least one content locator rule and at least one content modifier rule;
   at least one content parser for locating at least one content reference from said received content based on said at least one content locator rule;
   at least one content modifier for preparing a second content request from said at least one located content reference according to said at least one content modifier rule; and
   at least one measurement subsystem for tracking at least one statistic related to said at least one transaction, said at least one measurement subsystem comprising:
      at least one timer capable of evaluating a time lapse between the time when said first content request was sent by said at least one content interface and the time when said content was received by said at least one content interface;
      at least one content accessibility checker for continuously determining an accessibility count by accessing said content received through said first content request; and
      at least one content verifier for continuously determining a content status determined by comparing said content to an expected content;
   wherein said at least one content interface is for providing said second content request to said at least one content provider.

7. The system as defined in claim 6, wherein said at least one content provider is located remotely from the system.

8. The system as defined in claim 1, wherein said at least one content provider is located remotely from the system.

* * * * *